US011873958B2

(12) United States Patent
Imagi

(10) Patent No.: US 11,873,958 B2
(45) Date of Patent: Jan. 16, 2024

(54) HEADLIGHT FOR VEHICLE

(71) Applicant: Mitsubishi Electric Corporation, Tokyo (JP)

(72) Inventor: Junichi Imagi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/764,462

(22) PCT Filed: Nov. 29, 2019

(86) PCT No.: PCT/JP2019/046752
§ 371 (c)(1),
(2) Date: Mar. 28, 2022

(87) PCT Pub. No.: WO2021/106184
PCT Pub. Date: Jun. 3, 2021

(65) Prior Publication Data
US 2022/0357009 A1 Nov. 10, 2022

(51) Int. Cl.

| | |
|---|---|
| ***F21S 41/151*** | (2018.01) |
| ***F21S 41/265*** | (2018.01) |
| ***F21S 41/147*** | (2018.01) |
| ***F21S 41/36*** | (2018.01) |
| ***F21Y 115/10*** | (2016.01) |
| ***F21W 107/10*** | (2018.01) |

(52) U.S. Cl.
CPC ........... *F21S 41/151* (2018.01); *F21S 41/147* (2018.01); *F21S 41/265* (2018.01); *F21S 41/36* (2018.01); *F21W 2107/10* (2018.01); *F21Y 2115/10* (2016.08)

(58) Field of Classification Search
CPC ...... F21S 41/147; F21S 41/151; F21S 41/265; F21S 41/36; F21W 2107/10
See application file for complete search history.

(56) References Cited

U.S. PATENT DOCUMENTS

2019/0017675 A1* 1/2019 Suwa ...................... F21S 41/24

FOREIGN PATENT DOCUMENTS

JP 2017-188332 A 10/2017

* cited by examiner

*Primary Examiner* — Karabi Guharay
(74) *Attorney, Agent, or Firm* — Birch, Stewart, Kolasch & Birch, LLP

(57) ABSTRACT

A headlight includes multiple semiconductor light sources arranged in a line, and an optical system including an integral-type optical member to form a predetermined light distribution by using light outputted by the multiple semiconductor light sources, wherein the integral-type optical member has an incidence surface portion, a cutoff line formation portion, a reflection surface portion and an exit surface portion, the incidence surface portion, the cutoff line formation portion, the reflection surface portion and the exit surface portion are arranged in order in such a way as to be along an optical path in the optical system, the exit surface portion has a uniform vertical curvature, and a horizontal illumination area is controlled by the reflection surface portion and a vertical illumination area is controlled by the exit surface portion.

6 Claims, 15 Drawing Sheets

HEADLIGHT FOR VEHICLE

TECHNICAL FIELD

The present disclosure relates to a headlight for vehicle (may be simply referred to as a "headlight" hereinafter).

BACKGROUND ART

Conventionally, headlights using semiconductor light sources have been developed. For example, headlights of so-called "projector type" have been developed. Further, for example, headlights of so-called "direct projection type" have been developed.

Typically, an optical system in a projector-type headlight includes a reflector, a light shield plate and a projector lens. A cutoff line in a light distribution for low beams (simply referred to as a "cutoff line" hereinafter) is formed by the light shield plate. In contrast with this, an optical system in a direct-projection-type headlight includes a projector lens having a portion for forming a cutoff line (referred to as a "cutoff line formation portion" hereinafter).

More specifically, a projector lens in a direct-projection-type headlight performs the functions of a reflector, a light shield plate and a projector lens in a projector-type headlight. In other words, a projector lens in a direct-projection-type headlight is an optical member in which a reflector, a light shield plate and a projector lens in a projector-type headlight are integrated. Hereinafter, such an integral optical member is referred to as an "integral-type optical member."

CITATION LIST

Patent Literature

Patent Literature 1: JP 2017-188332 A

SUMMARY OF INVENTION

Technical Problem

Hereinafter, a direction corresponding to an upward or downward direction of a headlight may be referred to as a "vertical direction" or a "longitudinal direction." Further, a direction corresponding to a rightward or leftward direction of a headlight may be referred to as a "horizontal direction" or a "lateral direction." Further, an area illuminated by a headlight is referred to as an "illumination area." Further, an illumination area with respect to the horizontal direction is referred to as a "horizontal illumination area." Further, an illumination area with respect to the vertical direction is referred to as a "vertical illumination area." Further, a curvature with respect to the horizontal direction is referred to as a "horizontal curvature." Further, a curvature with respect to the vertical direction is referred to as a "vertical curvature."

It is difficult to achieve a light intensity needed in a so-called "hotspot" by using a single semiconductor light source. Therefore, headlights using multiple semiconductor light sources have been developed. Particularly, projector-type headlights using multiple semiconductor light sources have been developed. The multiple semiconductor light sources are arranged in a line. For example, the multiple semiconductor light sources are aligned in the horizontal direction.

Typically, an optical system in a projector-type headlight using multiple semiconductor light sources includes multiple reflectors and multiple projector lenses. The multiple reflectors are aligned in the same direction as a direction in which the multiple semiconductor light sources are aligned. The multiple projector lenses are aligned in the same direction as the direction in which the multiple semiconductor light sources are aligned. An exit surface portion of each of the projector lenses has a predetermined horizontal curvature and a predetermined vertical curvature. More specifically, the exit surface portion of each of the projector lenses has a substantially spherical shape. As a result, while the horizontal illumination area is controlled to be a predetermined area, the vertical illumination area is controlled to be a predetermined area. A problem is that this structure causes a high degree of unevenness on a front portion of the optical system.

In contrast with this, an optical system in a headlight described in Patent Literature 1 includes a single transparent member instead of multiple projector lenses. Unevenness is provided for an incidence surface portion of the single transparent member and is used for the control of an illumination area. This structure reduces the degree of unevenness on a front portion of the optical system (for example, refer to Abstract and FIG. 2 of Patent Literature 1).

Here, the incidence surface portion of the single transparent member in the headlight described in Patent Literature 1 is a surface portion provided, on an optical path, between multiple reflectors and an exit surface portion of the single transparent member. In an integral-type optical member, there is no surface portion corresponding to such surface portion provided between multiple reflectors and an exit surface portion. Therefore, a problem with the structure described in Patent Literature 1 is that it cannot be applied to direct-projection-type headlights.

The present disclosure is made in order to solve the above-mentioned problems, and it is therefore an object of the present disclosure to reduce the degree of unevenness on a front portion of an optical system in a direct-projection-type headlight using multiple semiconductor light sources.

Solution to Problem

According to the present disclosure, there is provided a headlight for vehicle including: multiple semiconductor light sources arranged in a line; and an optical system including an integral-type optical member to form a predetermined light distribution by using light outputted by the multiple semiconductor light sources, in which the integral-type optical member has an incidence surface portion, a cutoff line formation portion, a reflection surface portion and an exit surface portion, the incidence surface portion, the cutoff line formation portion, the reflection surface portion and the exit surface portion are arranged in order in such a way as to be along an optical path in the optical system, the exit surface portion has a uniform vertical curvature, and a horizontal illumination area is controlled by the reflection surface portion and a vertical illumination area is controlled by the exit surface portion.

Advantageous Effects of Invention

According to the present disclosure, with the configuration as above, a horizontal curvature of the exit surface portion of the integral-type optical member can be 0. As a result, the degree of unevenness on a front portion of the optical system can be reduced.

DESCRIPTION OF EMBODIMENTS

Hereinafter, in order to explain the present disclosure in greater detail, embodiments of the present disclosure will be described with reference to the accompanying drawings.

Embodiment 1

Figure 1:
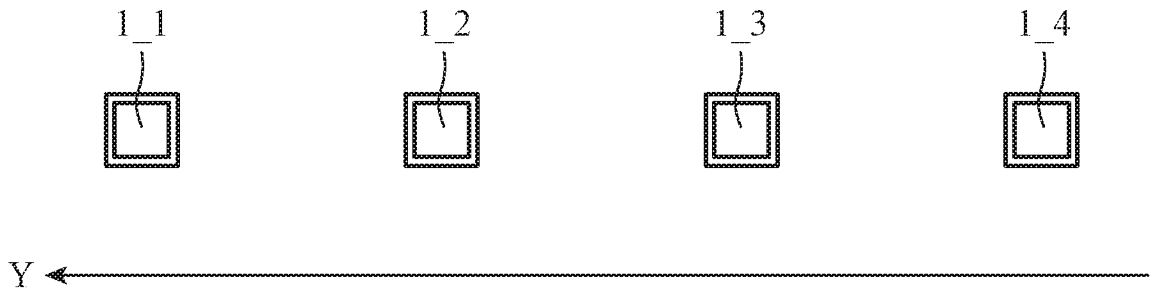
FIG. 1 is an explanatory drawing showing multiple semiconductor light sources in a headlight for vehicle according to Embodiment 1.
Figure 2:
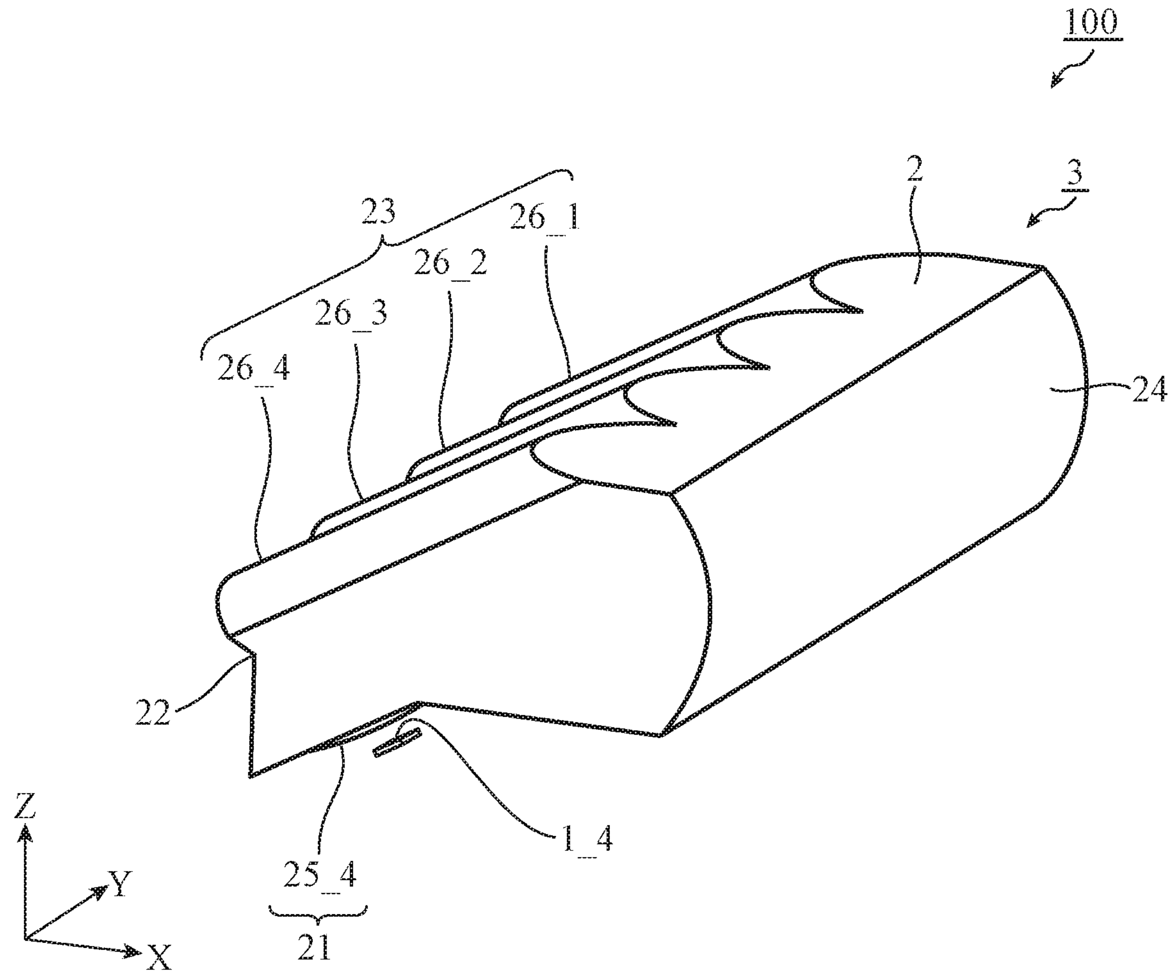
FIG. 2 is a perspective view showing a main part of the headlight for vehicle according to Embodiment 1.
Figure 3:
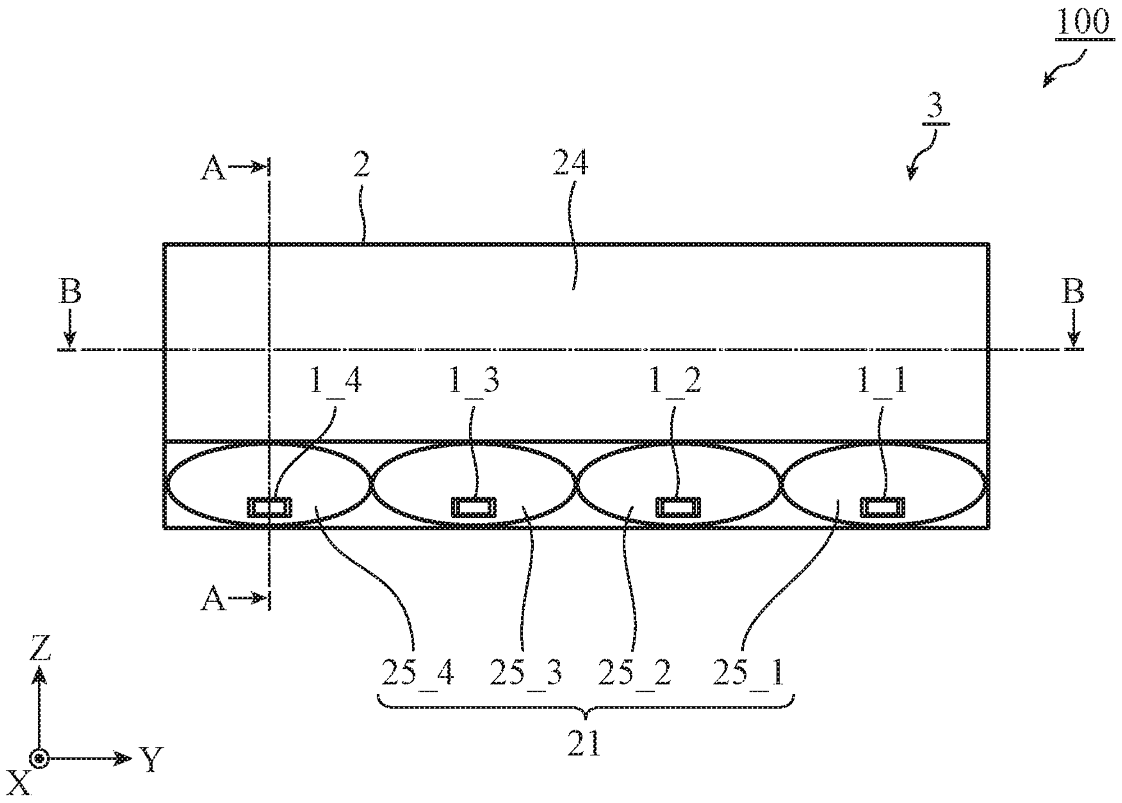
FIG. 3 is a front view showing the main part of the headlight for vehicle according to Embodiment 1.
Figure 4:
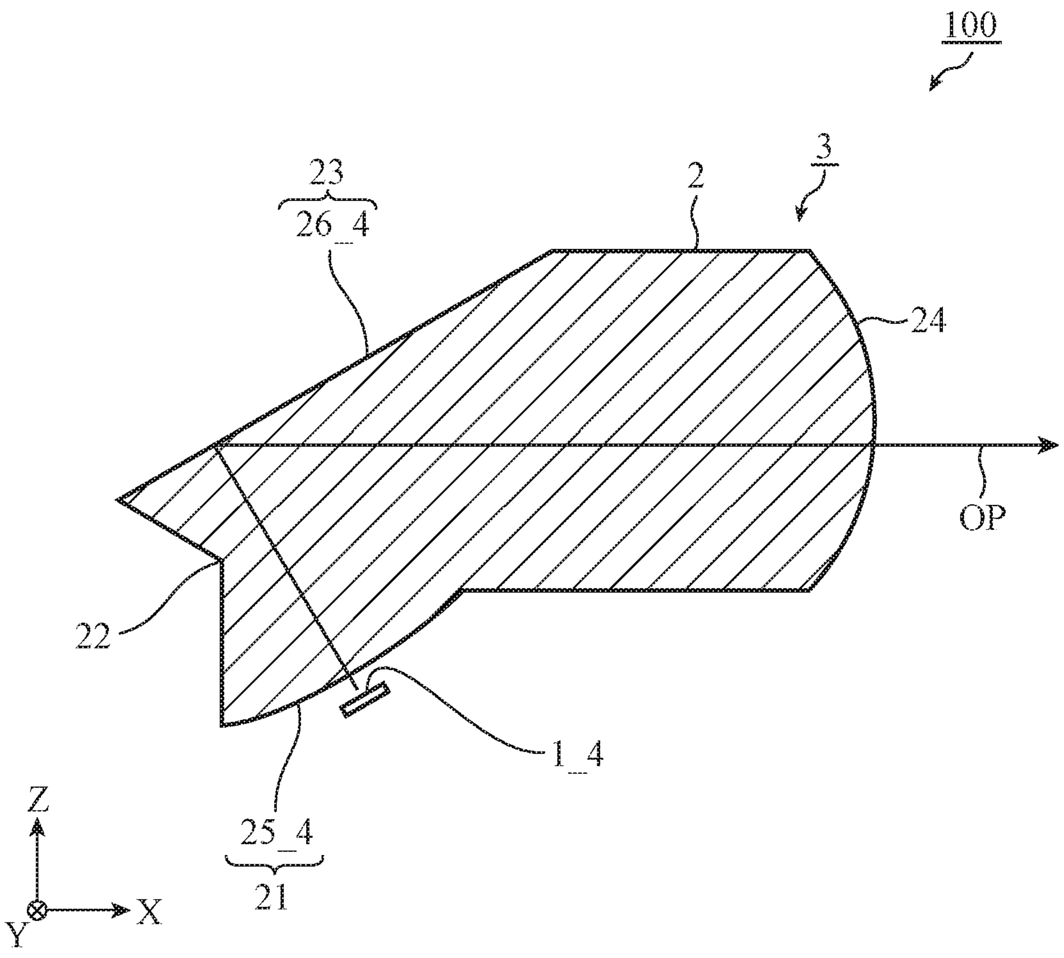
FIG. 4 is a cross-sectional view taken along line A-A shown in FIG. 3.
Figure 5:
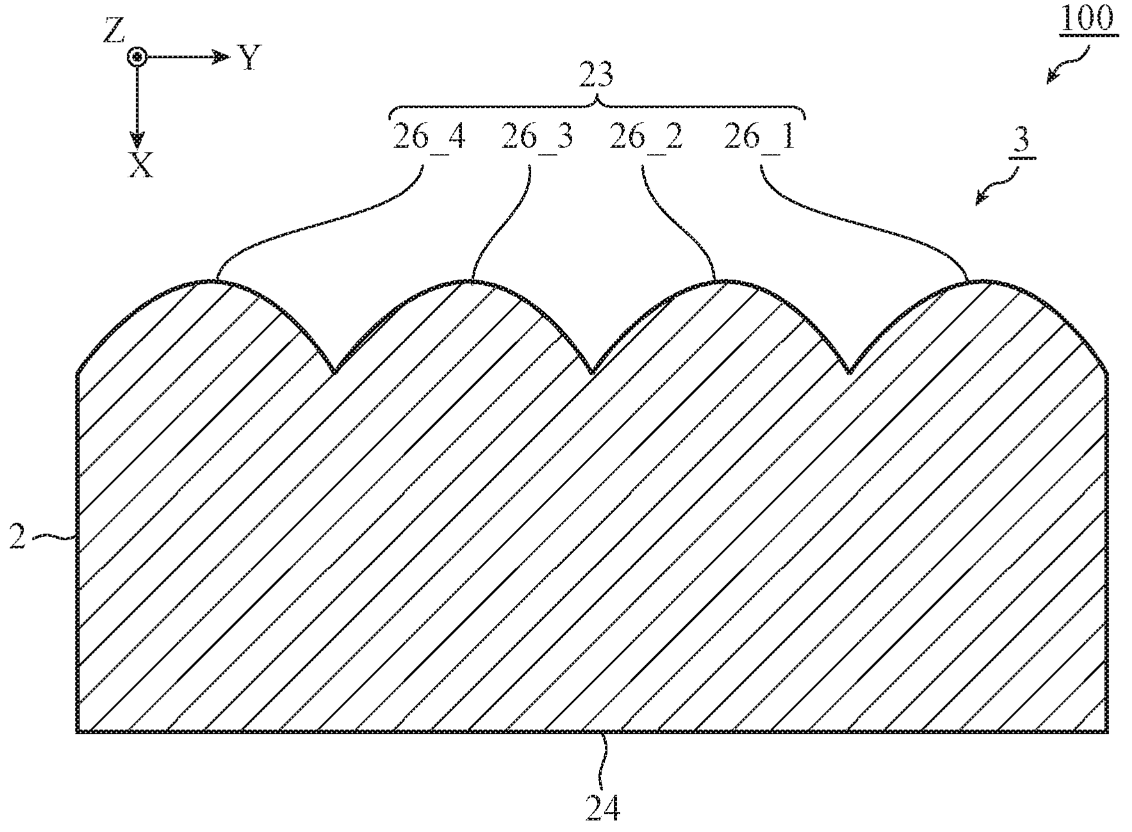
FIG. 5 is a cross-sectional view taken along line B-B shown in FIG. 3.

FIG. 1 is an explanatory drawing showing multiple semiconductor light sources in a headlight for vehicle according to Embodiment 1. FIG. 2 is a perspective view showing a main part of the headlight for vehicle according to Embodiment 1. FIG. 3 is a front view showing the main part of the headlight for vehicle according to Embodiment 1. FIG. 4 is a cross-sectional view taken along line A-A shown in FIG. 3. FIG. 5 is a cross-sectional view taken along line B-B shown in FIG. 3. Referring to FIGS. 1 to 5, the headlight for vehicle according to Embodiment 1 will be explained.

The headlight 100 is used as either a left headlight or a right headlight of a vehicle (not shown). In the figure, an X axis shows a virtual axis extending along a frontward or backward direction of the headlight 100, i.e., a frontward or backward direction of the vehicle. Further, a Y axis shows a virtual axis extending along a rightward or leftward direction of the headlight 100, i.e., a rightward or leftward direction of the vehicle. Further, a Z axis shows a virtual axis extending along an upward or downward direction of the headlight 100, i.e., an upward or downward direction of the vehicle.

The headlight 100 has multiple semiconductor light sources 1. For example, a light emitting diode (LED) is used as each of the semiconductor light sources 1. The multiple semiconductor light sources 1 are arranged in a line. In an example shown in FIGS. 1 to 5, four semiconductor light sources 1_1, 1_2, 1_3 and 1_4 are aligned in a direction extending along the Y axis. More specifically, the four semiconductor light sources 1_1, 1_2, 1_3 and 1_4 are aligned in a horizontal direction.

The headlight 100 has an integral-type optical member 2. The integral-type optical member 2 is made from, for example, glass or transparent resin. The integral-type optical member 2 is shared among the multiple semiconductor light sources 1. A main part of an optical system 3 is constituted by the integral-type optical member 2.

In the figure, OP denotes an example of an optical path in the optical system 3. The integral-type optical member 2 has an incidence surface portion 21, a cutoff line formation portion 22, a reflection surface portion 23 and an exit surface portion 24. As shown in FIG. 4, the incidence surface portion 21, the cutoff line formation portion 22, the reflection surface portion 23 and the exit surface portion 24 are arranged in order in such a way as to be along the optical path OP.

Here, the incidence surface portion 21 is provided for a base portion of the integral-type optical member 2, i.e., a base portion of the optical system 3, as shown in FIG. 4. The cutoff line formation portion 22 and the reflection surface portion 23 are provided for a rear portion of the integral-type optical member 2, i.e., a rear portion of the optical system 3. The exit surface portion 24 is provided for a front portion of the integral-type optical member 2, i.e., a front portion of the optical system 3.

The incidence surface portion 21 is constituted by multiple incidence surface parts 25 corresponding to the multiple semiconductor light sources 1. The multiple incidence surface parts 25 are arranged in a line. Each of the incidence surface parts 25 is provided while facing a corresponding semiconductor light source 1 out of the multiple semiconductor light sources 1.

In the example shown in FIGS. 1 to 5, four incidence surface parts 25_1, 25_2, 25_3 and 25_4 are aligned in the horizontal direction. The incidence surface parts 25_1, 25_2, 25_3 and 25_4 are arranged while facing the semiconductor light sources 1_1, 1_2, 1_3 and 1_4, respectively.

The reflection surface portion 23 is constituted by multiple reflection surface parts 26 corresponding to the multiple semiconductor light sources 1. The multiple reflection surface parts 26 are arranged in a line. Each of the reflection surface parts 26 has a predetermined horizontal curvature Rh.

In the example shown in FIGS. 1 to 5, four reflection surface parts 26_1, 26_2, 26_3 and 26_4 are aligned in the horizontal direction. The reflection surface parts 26_1, 26_2, 26_3 and 26_4 have horizontal curvatures Rh_1, Rh_2, Rh_3 and Rh_4, respectively. Each of the horizontal curvatures Rh_1, Rh_2, Rh_3 and Rh_4 is set to a value larger than 0. More specifically, each of the reflection surface parts 26_1, 26_2, 26_3 and 26_4 has a concave mirror-like shape.

Here, each of the reflection surface parts 26 may have a metal film formed by vapor deposition. More specifically, the reflection in each of the reflection surface parts 26 may be caused by so-called "external reflection." As an alternative, each of the reflection surface parts 26 may omit to have a metal film formed by vapor deposition. More specifically, the reflection in each of the reflection surface parts 26 may be caused by so-called "internal reflection."

The exit surface portion 24 has a uniform or substantially uniform vertical curvature Rv. Hereinafter, being uniform or substantially uniform is generically and simply referred to as being "uniform." The vertical curvature Rv is set to a value larger than 0. More specifically, the exit surface portion 24 has a convex lens shape.

The main part of the headlight 100 is constituted in this way.

Next, the operation of the headlight 100 will be explained.

First, the multiple semiconductor light sources 1 output light. The outputted light is incident upon the incidence surface portion 21. The incident light is reflected by the reflection surface portion 23. The exit surface portion 24 outputs the reflected light. More concretely, each of the multiple semiconductor light sources 1 outputs light. The outputted light is incident upon a corresponding incidence surface part 25 out of the multiple incidence surface parts 25. The incident light is reflected by a corresponding reflection surface part 26 out of the multiple reflection surface parts 26. The exit surface portion 24 outputs the reflected light. As a result, an area in front of the vehicle is illuminated.

At this time, the presence of the cutoff line formation portion 22 between the incidence surface portion 21 and the reflection surface portion 23 causes a cutoff line to be formed. Further, a horizontal illumination area is controlled to be a predetermined area by the horizontal curvatures Rh of the respective reflection surface parts 26. Further, a vertical illumination area is controlled to be a predetermined area by the vertical curvature Rv of the exit surface portion 24. As a result, a predetermined light distribution (e.g., a light distribution for low beams) can be achieved. Further, a sufficient light intensity in the hotspot can be achieved.

Next, advantageous effects of the headlight 100 will be explained.

First, typically, by using a direct projection method, downsizing of a headlight in the longitudinal direction can be achieved as compared with the case of using a projector method. Here, the headlight 100 is the one which uses the integral-type optical member 2. More specifically, the headlight 100 is the one which uses a direct projection method. As a result, downsizing of the headlight 100 in the longitudinal direction can be achieved.

Second, typically, an optical system in a direct-projection-type headlight which uses multiple semiconductor light sources includes multiple integral-type optical members corresponding to the multiple semiconductor light sources. The multiple integral-type optical members are aligned in the same direction as that in which the multiple semiconductor light sources are aligned. A problem with this structure is that the structure causes upsizing of the headlight in the lateral direction.

In contrast with this, the headlight 100 is the one which uses the single integral-type optical member 2 shared among the multiple semiconductor light sources 1. As a result, downsizing of the headlight 100 in the lateral direction can be achieved.

Third, typically in a direct-projection-type headlight which uses multiple semiconductor light sources, the exit surface portion of each integral-type optical member has a predetermined vertical curvature and a predetermined horizontal curvature. As a result, while the horizontal illumination area is controlled, the vertical illumination area is controlled. A problem with this structure is that the structure causes a high degree of unevenness on the front portion of the optical system. This results in a problem in which the design of the headlight is impaired. Another problem is that it is difficult to control the horizontal illumination area and the vertical illumination area separately.

In contrast with this, in the headlight 100, while the horizontal illumination area is controlled using the horizontal curvatures Rh of the respective reflection surface parts 26, the vertical illumination area is controlled using the vertical curvature Rv of the exit surface portion 24. This structure enables a horizontal curvature of the exit surface portion 24 to be 0. As a result, the degree of unevenness on the exit surface portion 24 can be reduced. More specifically, the degree of unevenness on the front portion of the optical system 3 can be reduced. As a result, the design of the headlight 100 can be improved. Further, the horizontal illumination area and the vertical illumination area can be controlled separately.

Next, a variant of the headlight 100 will be explained with reference to FIGS. 6 and 7.

Each of incidence surface parts 25 may correspond to two or more semiconductor light sources out of multiple semiconductor light sources 1. Each of reflection surface parts 26 may correspond to two or more semiconductor light sources out of the multiple semiconductor light sources 1.

Figure 6:
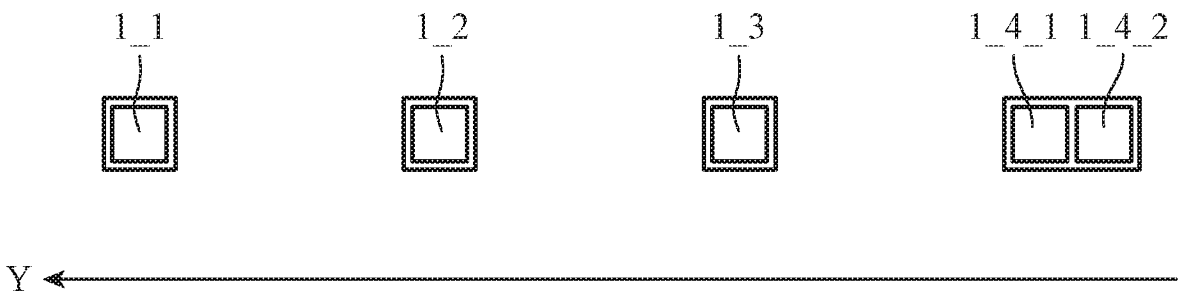
FIG. 6 is an explanatory drawing showing multiple semiconductor light sources in another headlight for vehicle according to Embodiment 1.
Figure 7:
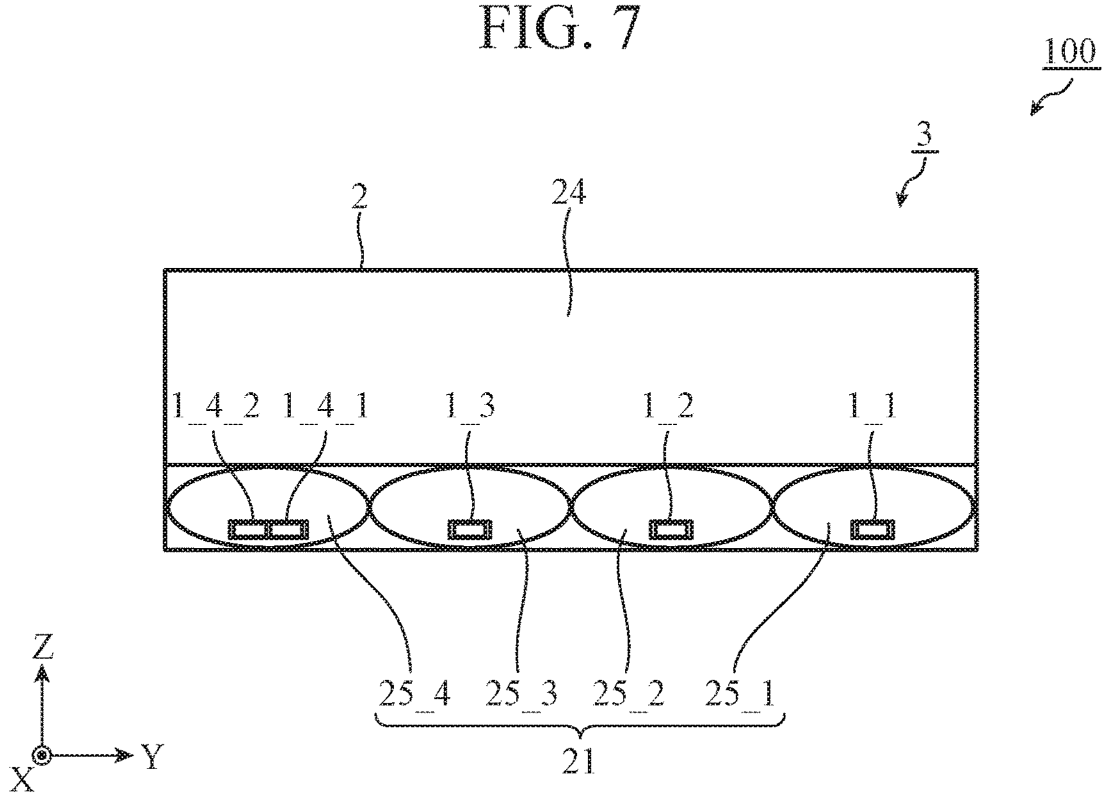
FIG. 7 is a front view showing a main part of the another headlight for vehicle according to Embodiment 1.
Figure 8:
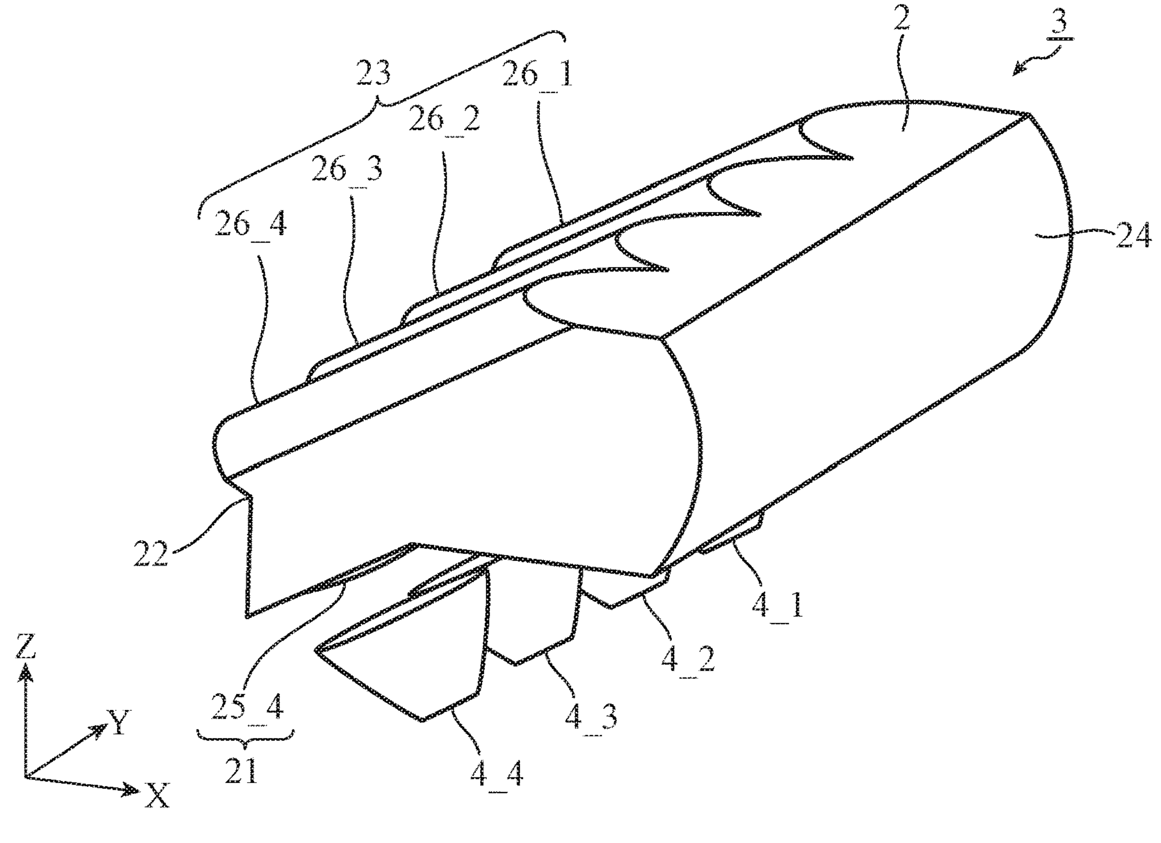
FIG. 8 is a perspective view showing a main part of an optical system in still another headlight for vehicle according to Embodiment 1.
Figure 9:
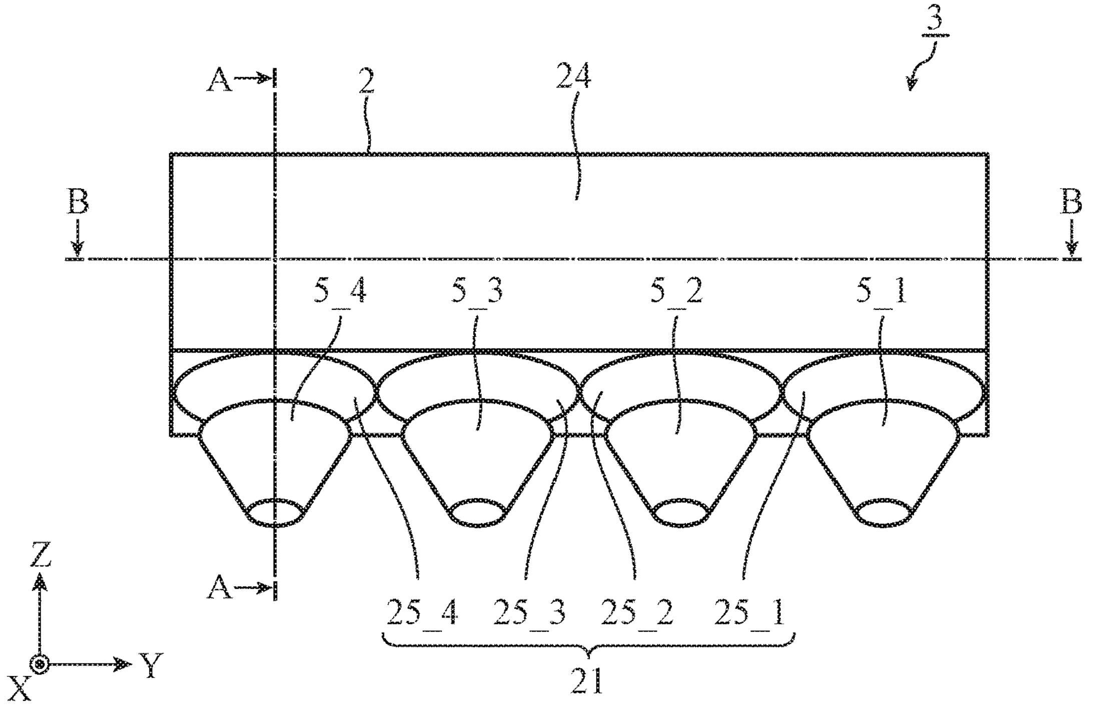
FIG. 9 is a front view showing the main part of the optical system in the still another headlight for vehicle according to Embodiment 1.
Figure 10:
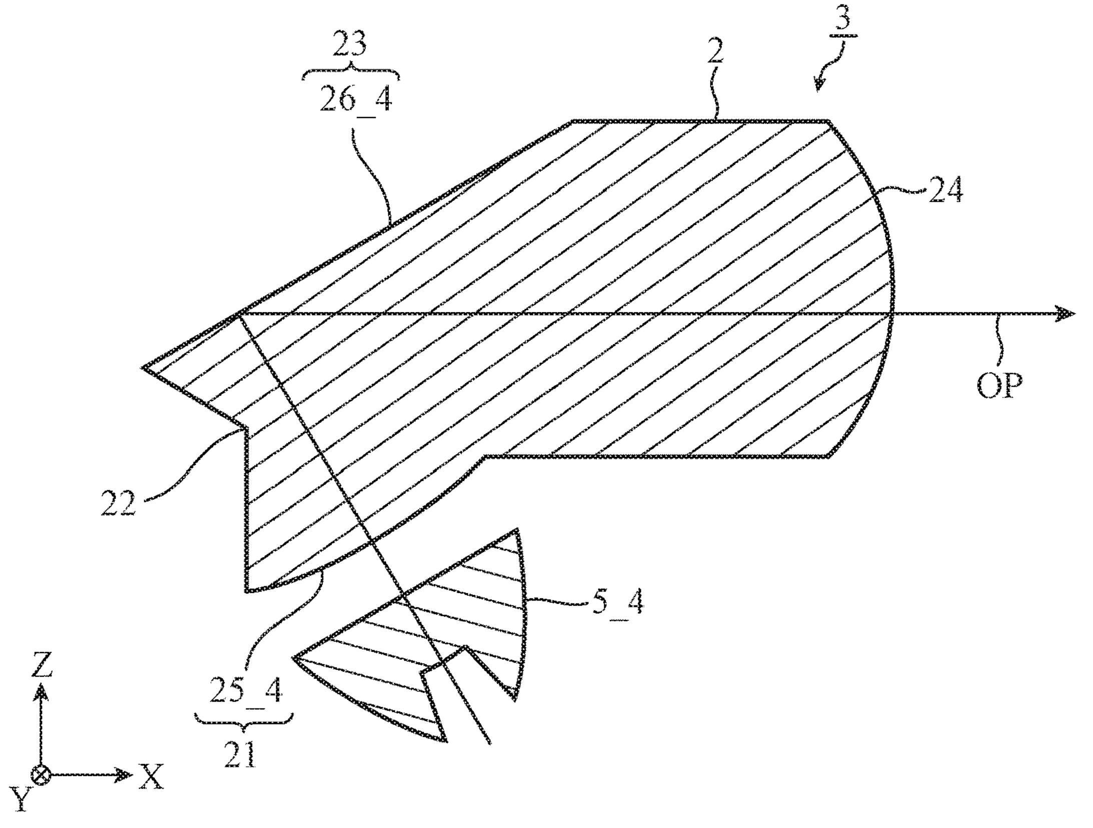
FIG. 10 is a cross-sectional view taken along line A-A shown in FIG. 9.
Figure 11:
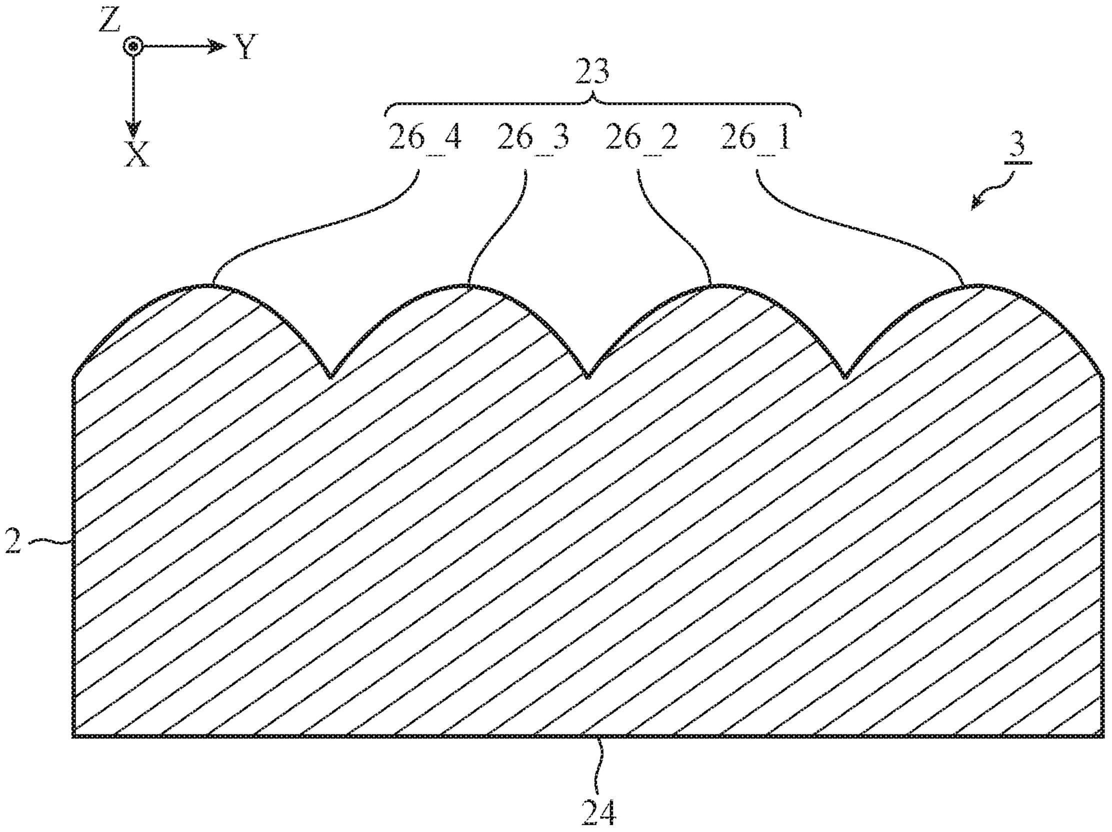
FIG. 11 is a cross-sectional view taken along line B-B shown in FIG. 9.

For example, as shown in FIGS. 6 and 7, one incidence surface part 25_4 out of four incidence surface parts 25_1, 25_2, 25_3 and 25_4 may correspond to two semiconductor light sources 1_4_1 and 1_4_2 out of five semiconductor light sources 1_1, 1_2, 1_3, 1_4_1 and 1_4_2. Further, one reflection surface part 26_4 out of four reflection surface parts 26_1, 26_2, 26_3 and 26_4 may correspond to the two semiconductor light sources 1_4_1 and 1_4_2 out of the five semiconductor light sources 1_1, 1_2, 1_3, 1_4_1 and 1_4_2.

As a result, the number of incidence surface parts 25 can be reduced in comparison with the number of semiconductor light sources 1. Further, the number of reflection surface parts 26 can be reduced in comparison with the number of semiconductor light sources 1. As a result, further downsizing of the headlight 100 in the lateral direction can be achieved.

Next, another variant of the headlight 100 will be explained with reference to FIGS. 8 to 11.

As shown in FIGS. 8 to 11, an optical system 3 may include multiple condensing lenses 4. Each of the condensing lenses 4 is provided between a corresponding semiconductor light source 1 out of multiple semiconductor light sources 1 and a corresponding incidence surface part 25 out of multiple incidence surface parts 25. In an example shown in FIGS. 8 to 11, four condensing lenses 4_1, 4_2, 4_3 and 4_4 are arranged, respectively, between four semiconductor light sources 1_1, 1_2, 1_3 and 1_4, and four incidence surface parts 25_1, 25_2, 25_3 and 25_4. In FIGS. 8 to 11, the semiconductor light sources 1_1, 1_2, 1_3 and 1_4 are not shown.

The presence of each of the condensing lenses 4 makes it possible to efficiently use light outputted by the corresponding semiconductor light source 1. As a result, the efficiency of light utilization in the headlight 100 can be improved.

As mentioned above, the headlight 100 includes the multiple semiconductor light sources 1 arranged in a line, and the optical system 3 including the integral-type optical member 2 to form a predetermined light distribution by using light outputted by the multiple semiconductor light sources 1. The integral-type optical member 2 has the incidence surface portion 21, the cutoff line formation portion 22, the reflection surface portion 23 and the exit surface portion 24. The incidence surface portion 21, the cutoff line formation portion 22, the reflection surface portion 23 and the exit surface portion 24 are arranged in order in such a way as to be along the optical path OP in the optical system 3. The exit surface portion 24 has a uniform vertical curvature Rv. The horizontal illumination area is controlled by the reflection surface portion 23 and the vertical illumination area is controlled by the exit surface portion 24. As a result, downsizing of the headlight 100 can be achieved. Further, the horizontal illumination area and the vertical illumination area can be controlled separately. Further, because the degree of unevenness on the front portion of the optical system 3 is reduced, the design of the headlight 100 can be improved.

Further, the reflection surface portion 23 includes the multiple reflection surface parts 26 corresponding to the multiple semiconductor light sources 1, the multiple reflection surface parts 26 are aligned in the horizontal direction, and each of the multiple reflection surface parts 26 is constituted by a concave mirror having a predetermined horizontal curvature Rh. As a result, the control of the horizontal illumination area can be implemented.

Further, one reflection surface part 26 out of the multiple reflection surface parts 26 corresponds to two or more semiconductor light sources 1 out of the multiple semiconductor light sources 1. As a result, further downsizing of the headlight 100 can be achieved.

Further, the exit surface portion 24 is provided for the front portion of the integral-type optical member 2, and the reflection surface portion 23 is provided for the rear portion of the integral-type optical member 2. As a result, the integral-type optical member 2 having a shape shown in, for example, FIGS. 2 to 5 can be implemented. Further, separately controlling the horizontal illumination area and the vertical illumination area can be facilitated.

Embodiment 2

Figure 12:
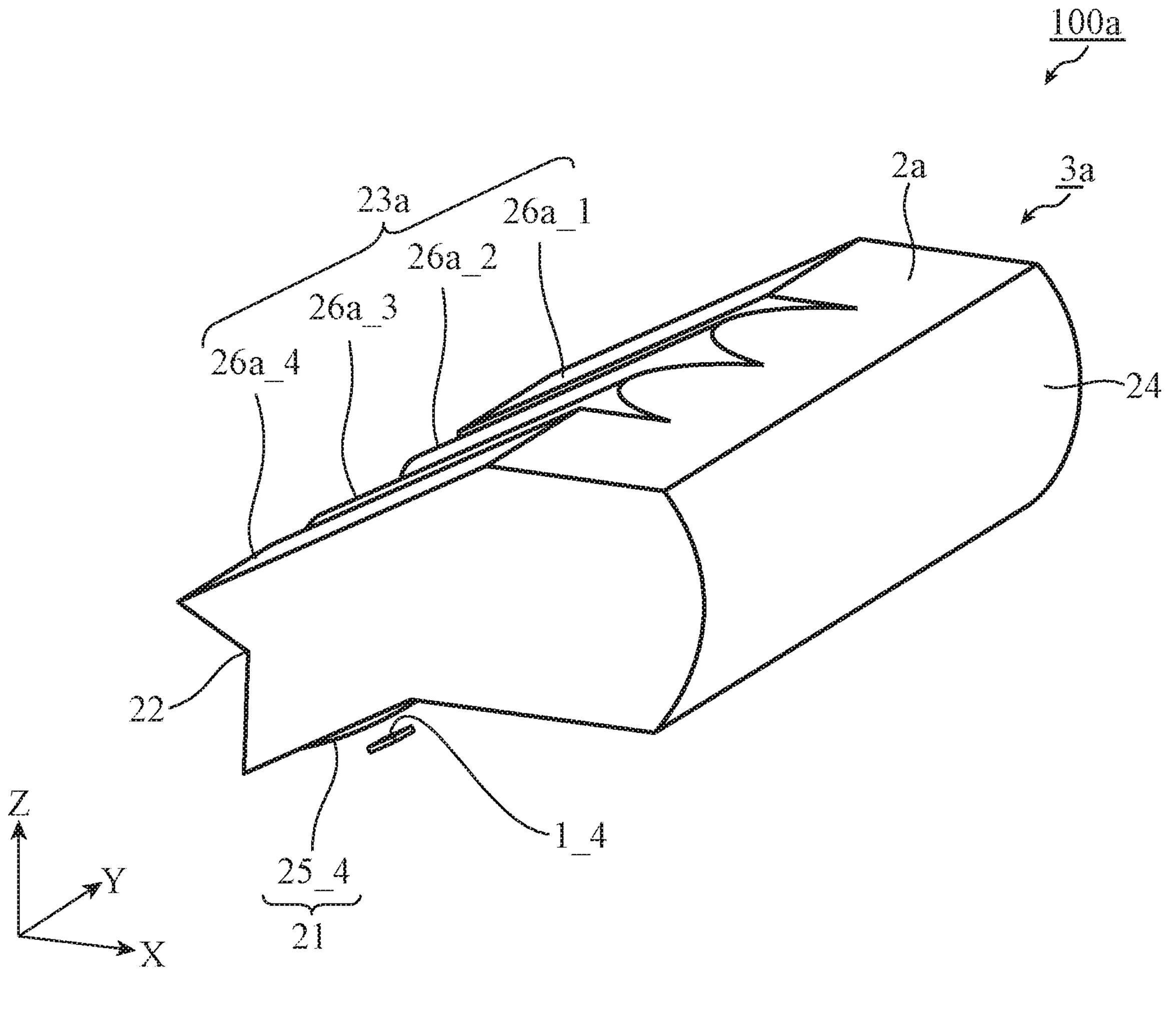
FIG. 12 is a perspective view showing a main part of a headlight for vehicle according to Embodiment 2.
Figure 13:
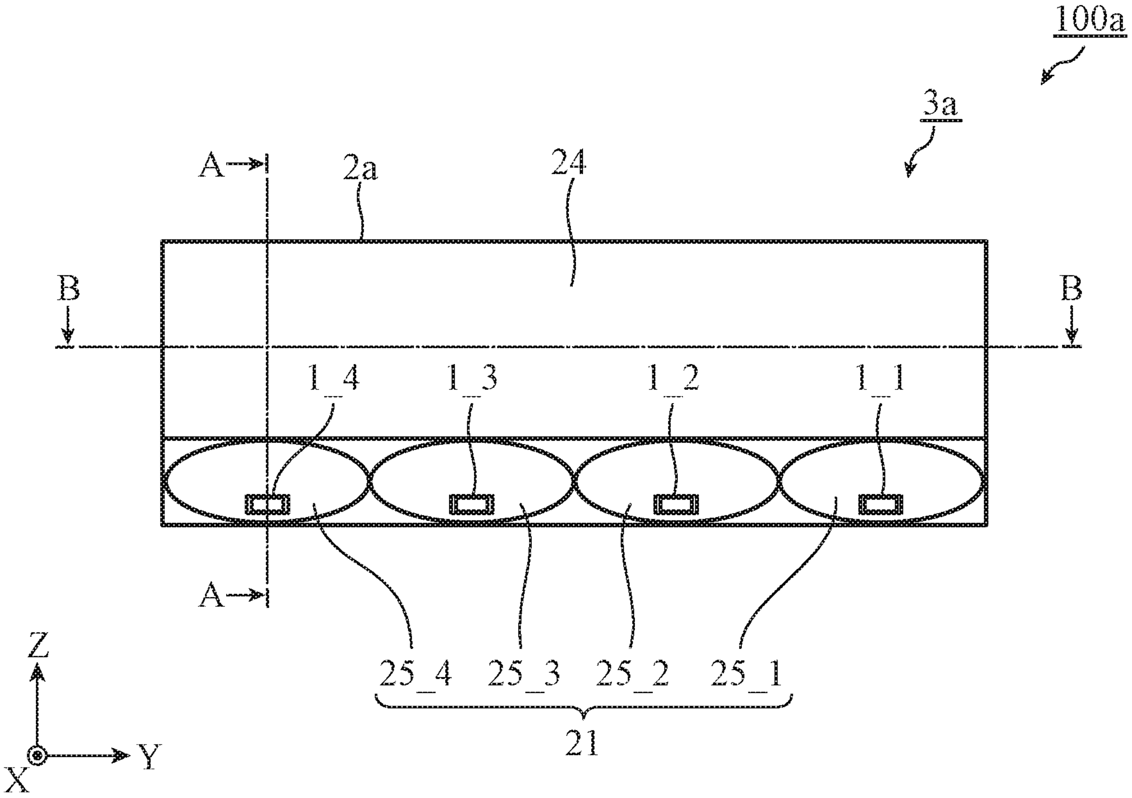
FIG. 13 is a front view showing the main part of the headlight for vehicle according to Embodiment 2.
Figure 14:
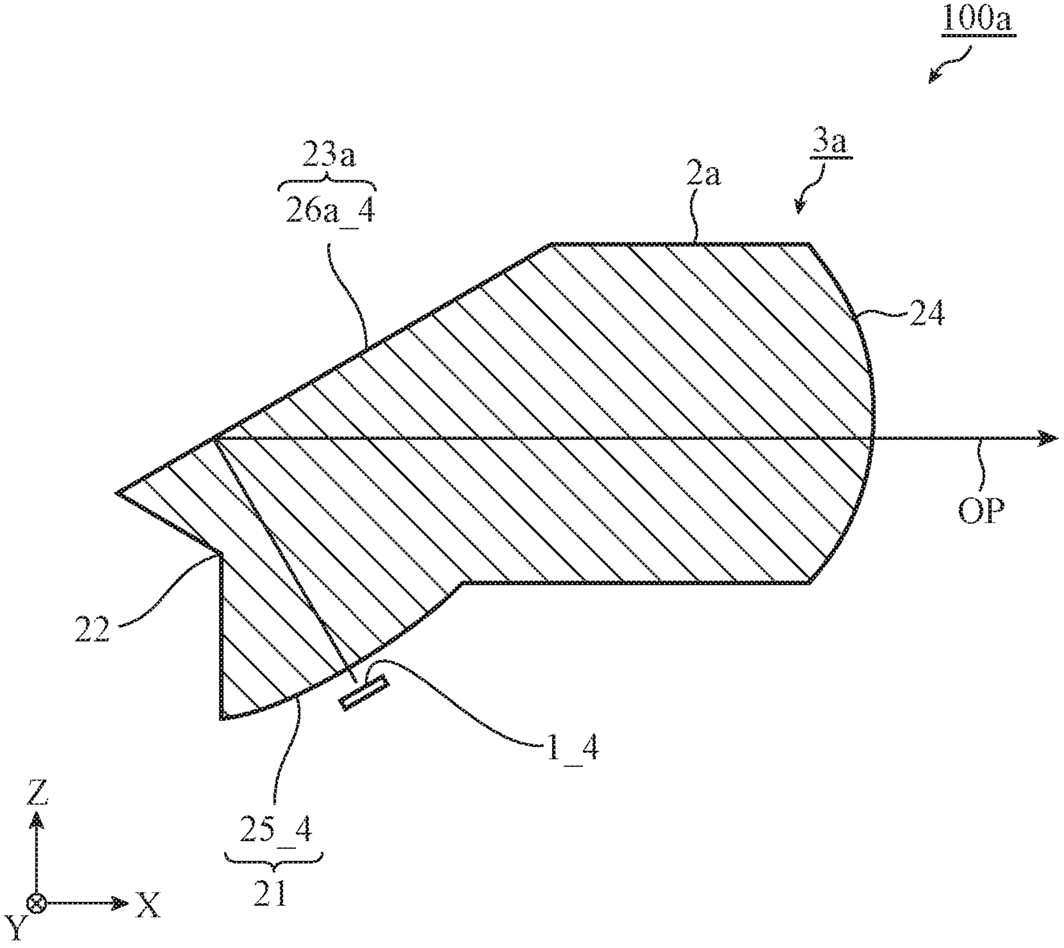
FIG. 14 is a cross-sectional view taken along line A-A shown in FIG. 13.
Figure 15:
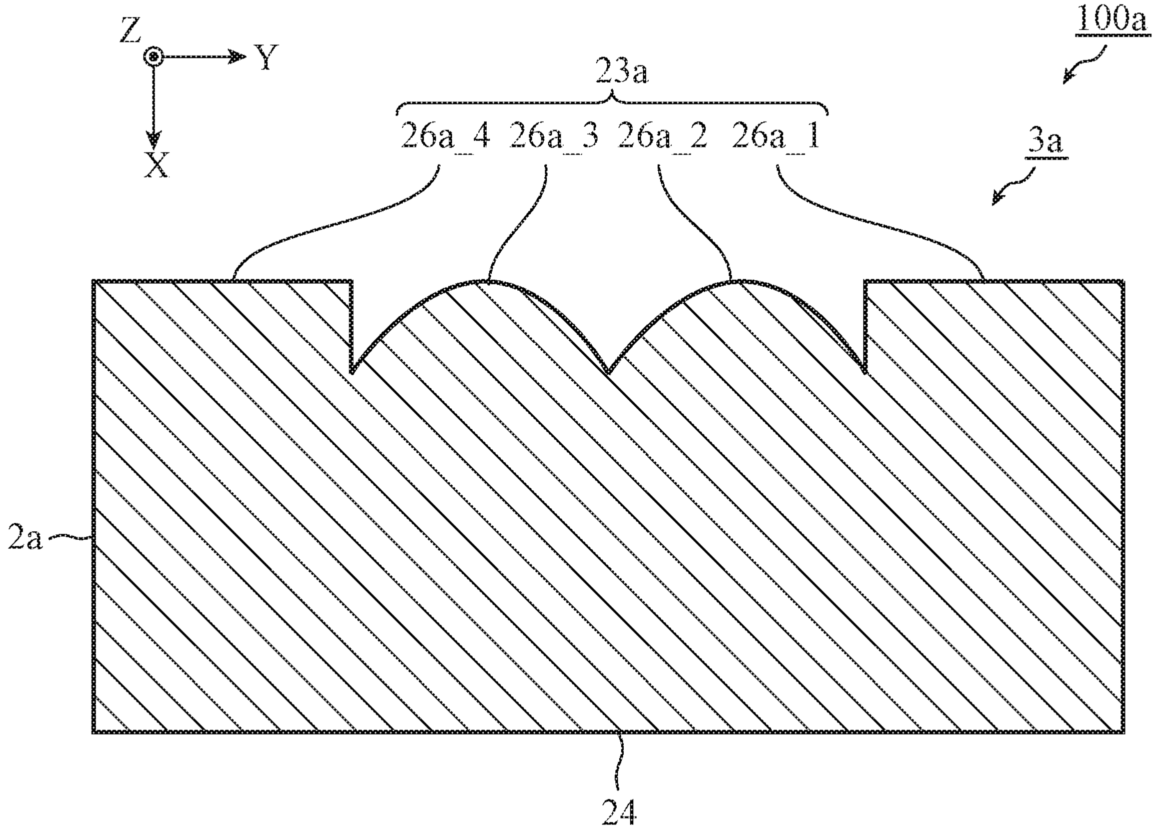
FIG. 15 is a cross-sectional view taken along line B-B shown in FIG. 13.

FIG. 12 is a perspective view showing a main part of a headlight for vehicle according to Embodiment 2. FIG. 13 is a front view showing the main part of the headlight for vehicle according to Embodiment 2. FIG. 14 is a cross-sectional view taken along line A-A shown in FIG. 13. FIG. 15 is a cross-sectional view taken along line B-B shown in FIG. 13. Referring to FIGS. 12 to 15, the headlight for vehicle according to Embodiment 2 will be explained. In FIGS. 12 to 15, the same components as those shown in FIGS. 1 to 5 are denoted by the same reference numerals, and an explanation of the components will be omitted.

The headlight 100*a* has an integral-type optical member 2*a*. A main part of an optical system 3*a* is constituted by the integral-type optical member 2*a*. The integral-type optical member 2*a* has a reflection surface portion 23*a*. The reflection surface portion 23*a* is constituted by multiple reflection surface parts 26*a* corresponding to multiple semiconductor light sources 1. The multiple reflection surface parts 26*a* are arranged in a line. Each of the reflection surface parts 26*a* has a predetermined horizontal curvature Rh.

Hereinafter, a direction in which the multiple reflection surface parts 26*a* are aligned may be referred to as the "alignment direction." Further, "on an inner side in the alignment direction" may be referred to as "inward in the alignment direction." Further, "on an outer side in the alignment direction" may be referred to as "outward in the alignment direction."

The multiple reflection surface parts 26*a* include one or more reflection surface parts 26*a* provided inward in the alignment direction (may be referred to as "first reflection surface parts" hereinafter), and two or more reflection surface parts 26*a* provided outward in the alignment direction (may be referred to as "second reflection surface parts" hereinafter). More specifically, the two or more second reflection surface parts 26*a* are provided, in the alignment direction, outward with respect to the one or more first reflection surface parts 26*a*. On the other hand, the one or more first reflection surface parts 26*a* are provided, in the alignment direction, inward with respect to the two or more second reflection surface parts 26*a*.

In an example shown in FIGS. 12 to 15, four reflection surface parts 26*a*_1, 26*a*_2, 26*a*_3 and 26*a*_4 are aligned in a horizontal direction. The reflection surface parts 26*a*_1, 26*a*_2, 26*a*_3 and 26*a*_4 have horizontal curvatures Rh_1, Rh_2, Rh_3 and Rh_4, respectively. The reflection surface parts 26*a*_1, 26*a*_2, 26*a*_3 and 26*a*_4 include two first reflection surface parts 26*a*_2 and 26*a*_3, and two second reflection surface parts 26*a*_1 and 26*a*_4.

Here, each of the horizontal curvatures Rh_1 and Rh_4 is set to a value which is small compared with those of the horizontal curvatures Rh_2 and Rh_3. More concretely, each of the horizontal curvatures Rh_2 and Rh_3 is set to a value larger than 0. In contrast with this, each of the horizontal curvatures Rh_1 and Rh_4 is set to 0.

More specifically, each of the first reflection surface parts 26*a*_2 and 26*a*_3 has a concave mirror-like shape. In contrast with this, each of the second reflection surface parts 26*a*_1 and 26*a*_4 has a plane mirror-like shape.

The main part of the headlight 100*a* is constituted in this way.

The operation of the headlight 100*a* is the same as that of the headlight 100. More specifically, the operation of the headlight 100*a* is the same as that explained in Embodiment 1. Therefore, an explanation thereof will be omitted.

Next, advantageous effects of the headlight 100*a* will be explained.

As mentioned above, each of the horizontal curvatures Rh_1 and Rh_4 is set to a value which is small compared with those of the horizontal curvatures Rh_2 and Rh_3. Therefore, each of the second reflection surface parts 26*a*_1 and 26*a*_4 has light condensing action which is weak compared with that provided by each of the first reflection surface parts 26*a*_2 and 26*a*_3. In other words, each of the horizontal curvatures Rh_2 and Rh_3 is set to a value which is large compared with those of the horizontal curvatures Rh_1 and Rh_4. Therefore, each of the first reflection surface parts 26*a*_2 and 26*a*_3 has light condensing action which is strong compared with that provided by each of the second reflection surface parts 26*a*_1 and 26*a*_4.

By using the first reflection surface parts 26*a*_2 and 26*a*_3 having such strong light condensing action, a sufficient light intensity in the hotspot can be achieved. Further, by using the second reflection surface parts 26*a*_1 and 26*a*_4 having such weak light condensing action, enlargement of the horizontal illumination area can be achieved.

Each of the horizontal curvatures Rh_1 and Rh_4 is not limited to 0. Each of the horizontal curvatures Rh_1 and Rh_4 should just be set to a value which is small compared with those of the horizontal curvatures Rh_2 and Rh_3.

Further, as the headlight 100*a*, the same various variants as those explained in Embodiment 1 can be adopted. More specifically, each of incidence surface parts 25 may correspond to two or more semiconductor light sources 1 out of the multiple semiconductor light sources 1. Further, each of the reflection surface parts 26*a* may correspond to two or more semiconductor light sources 1 out of the multiple semiconductor light sources 1. Further, the optical system 3*a* may include multiple condensing lenses 4.

As mentioned above, in the headlight 100*a*, the reflection surface portion 23*a* includes the multiple reflection surface parts 26*a* corresponding to the multiple semiconductor light sources 1, the multiple reflection surface parts 26*a* are aligned in the horizontal direction, and each of the multiple reflection surface parts 26*a* is constituted by a concave mirror or a plane mirror having a predetermined horizontal curvature Rh. As a result, control of the horizontal illumination area can be implemented.

Further, the multiple reflection surface parts 26*a* include the one or more first reflection surface parts 26*a* provided inward in the alignment direction, and the two or more second reflection surface parts 26*a* provided outward in the alignment direction. The horizontal curvature Rh of each of the two or more second reflection surface parts 26*a* is set to a value which is small compared with the horizontal curvature Rh of each of the one or more first reflection surface parts 26*a*. As a result, while a sufficient light intensity in the hotspot is achieved, enlargement of the horizontal illumination area can be achieved.

Embodiment 3

Figure 16:
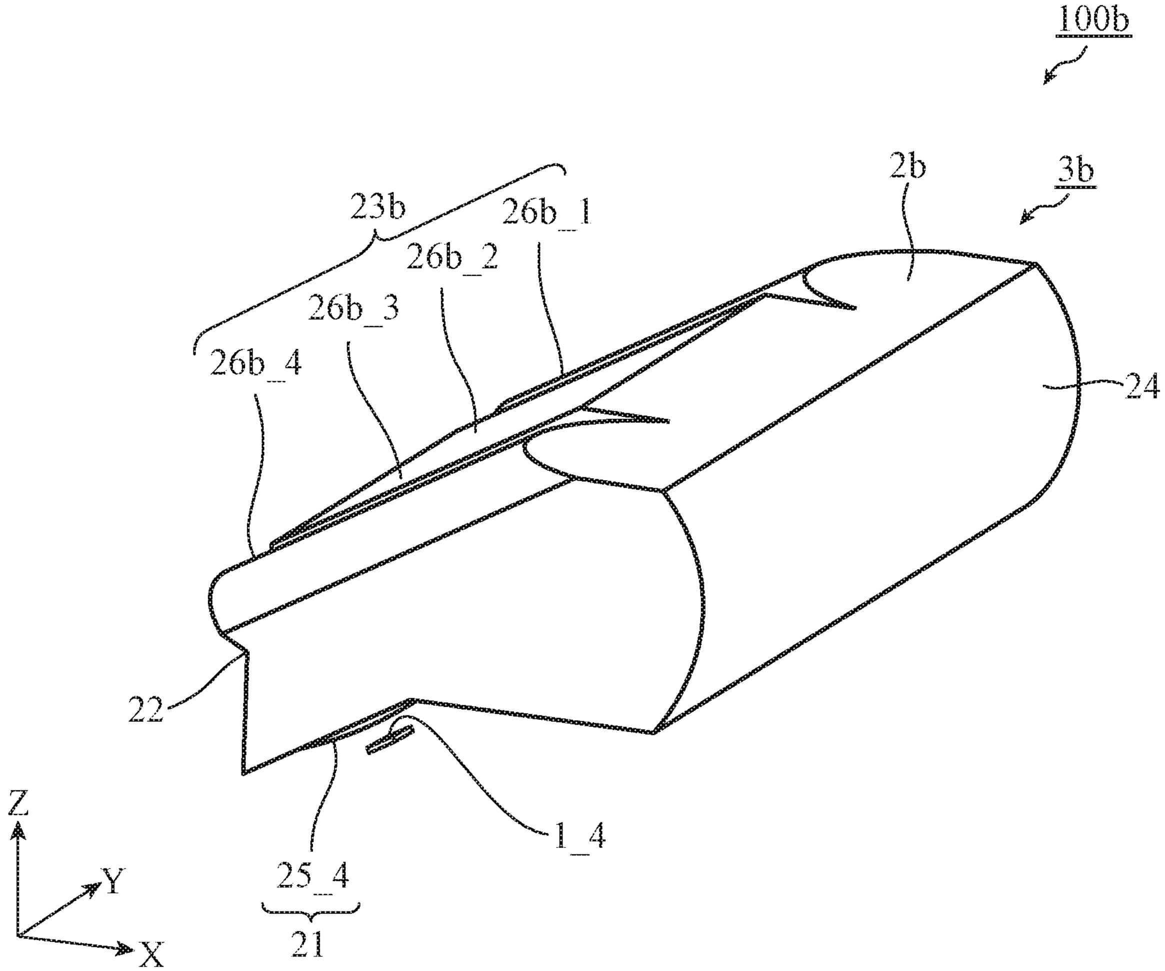
FIG. 16 is a perspective view showing a main part of a headlight for vehicle according to Embodiment 3.
Figure 17:
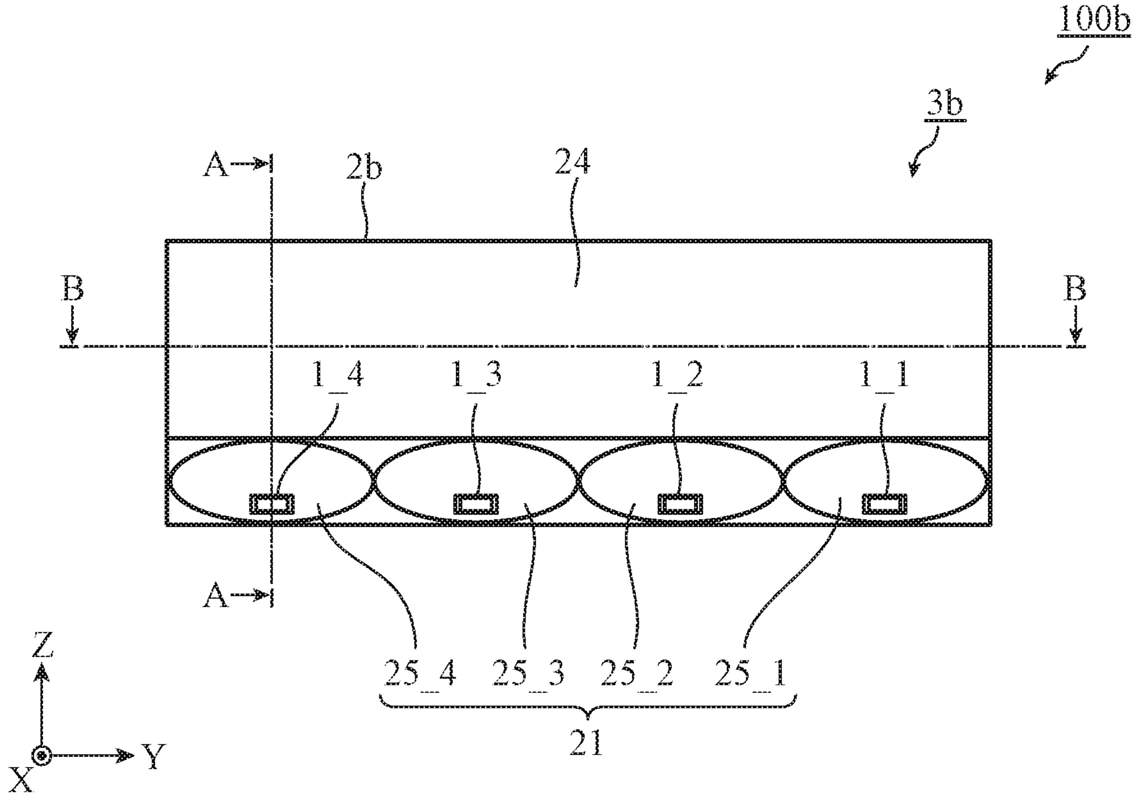
FIG. 17 is a front view showing the main part of the headlight for vehicle according to Embodiment 3.
Figure 18:
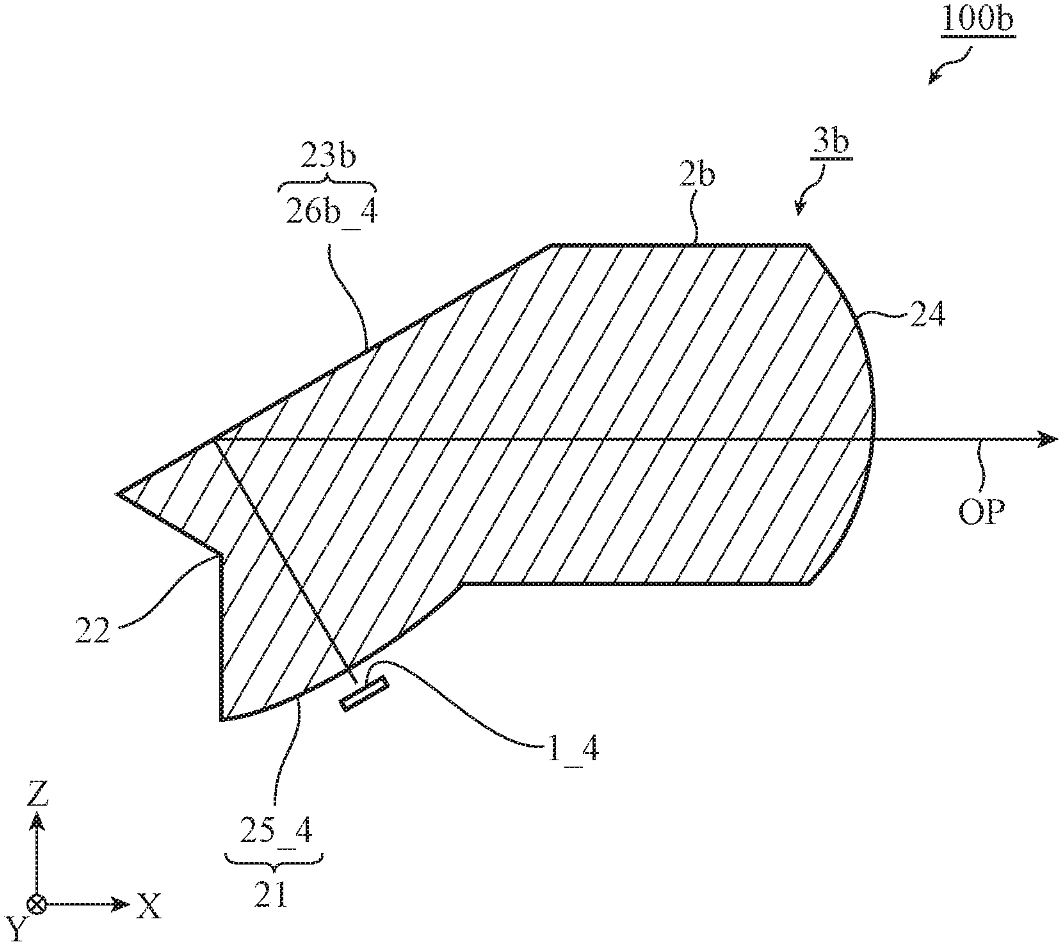
FIG. 18 is a cross-sectional view taken along line A-A shown in FIG. 17.
Figure 19:
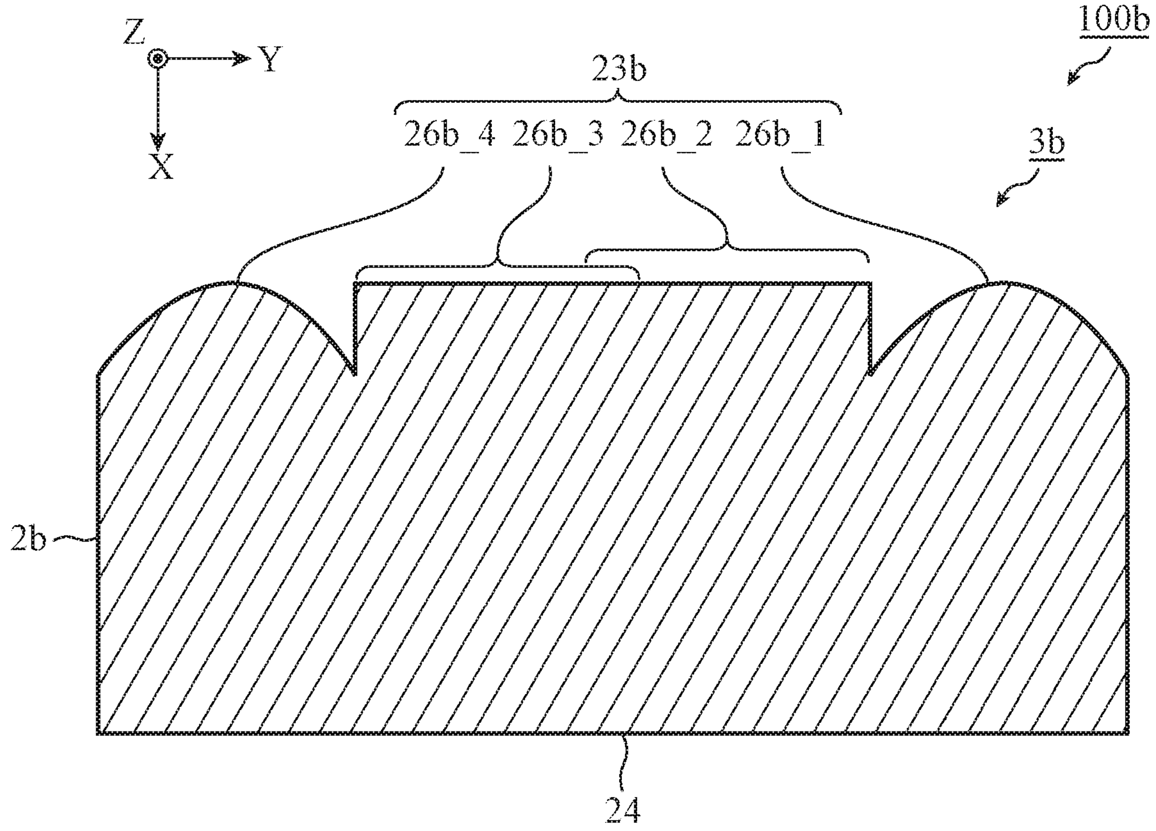
FIG. 19 is a cross-sectional view taken along line B-B shown in FIG. 17.

FIG. 16 is a perspective view showing a main part of a headlight for vehicle according to Embodiment 3. FIG. 17 is a front view showing the main part of the headlight for vehicle according to Embodiment 3. FIG. 18 is a cross-sectional view taken along line A-A shown in FIG. 17. FIG. 19 is a cross-sectional view taken along line B-B shown in FIG. 17. Referring to FIGS. 16 to 19, the headlight for vehicle according to Embodiment 3 will be explained. In FIGS. 16 to 19, the same components as those shown in FIGS. 1 to 5 are denoted by the same reference numerals, and an explanation of the components will be omitted.

The headlight 100*b* has an integral-type optical member 2*b*. A main part of an optical system 3*b* is constituted by the integral-type optical member 2*b*. The integral-type optical member 2*b* has a reflection surface portion 23*b*. The reflection surface portion 23*b* is constituted by multiple reflection surface parts 26*b* corresponding to multiple semiconductor light sources 1. The multiple reflection surface parts 26*b* are arranged in a line. Each of the reflection surface parts 26*b* has a predetermined horizontal curvature Rh.

The multiple reflection surface parts 26*b* include one or more first reflection surface parts 26*b* and two or more second reflection surface parts 26*b*. More specifically, the two or more second reflection surface parts 26*b* are provided, in an alignment direction, outward with respect to the one or more first reflection surface parts 26*b*. On the other hand, the one or more first reflection surface parts 26*b* are provided, in the alignment direction, inward with respect to the two or more second reflection surface parts 26*b*.

In an example shown in FIGS. 16 to 19, four reflection surface parts 26*b*_1, 26*b*_2, 26*b*_3 and 26*b*_4 are aligned in a horizontal direction. The reflection surface parts 26*b*_1, 26*b*_2, 26*b*_3 and 26*b*_4 have horizontal curvatures Rh_1, Rh_2, Rh_3 and Rh_4, respectively. The reflection surface parts 26*b*_1, 26*b*_2, 26*b*_3 and 26*b*_4 include two first reflection surface parts 26*b*_2 and 26*b*_3 and two second reflection surface parts 26*b*_1 and 26*b*_4.

Here, each of the horizontal curvatures Rh_2 and Rh_3 is set to a value which is small compared with those of the horizontal curvatures Rh_1 and Rh_4. More concretely, each of the horizontal curvatures Rh_1 and Rh_4 is set to a value larger than 0. In contrast with this, each of the horizontal curvatures Rh_2 and Rh_3 is set to 0.

More specifically, each of the second reflection surface parts 26*b*_1 and 26*b*_4 has a concave mirror-like shape. In contrast with this, each of the first reflection surface parts 26*b*_2 and 26*b*_3 has a plane mirror-like shape. As shown in FIG. 19, the first reflection surface parts 26*b*_2 and 26*b*_3 are arranged to partially overlap each other.

The main part of the headlight 100*b* is constituted in this way.

The operation of the headlight 100*b* is the same as that of the headlight 100. More specifically, the operation of the headlight 100*b* is the same as that explained in Embodiment 1. Therefore, an explanation thereof will be omitted.

Next, advantageous effects of the headlight 100*b* will be explained.

As mentioned above, each of the horizontal curvatures Rh_2 and Rh_3 is set to a value which is small compared with those of the horizontal curvatures Rh_1 and Rh_4. More concretely, each of the horizontal curvatures Rh_2 and Rh_3 is set to 0. As a result, each of the first reflection surface parts 26*b*_2 and 26*b*_3 can be shaped into a plane mirror. As a result, the first reflection surface parts 26*b*_2 and 26*b*_3 can be arranged to partially overlap each other.

The partially-overlapping arrangement of the first reflection surface parts 26*b*_2 and 26*b*_3 can achieve downsizing of the integral-type optical member 2*b* in a lateral direction as compared with an assumed case in which the first reflection surface parts 26*b*_2 and 26*b*_3 are arranged not to overlap each other. As a result, further downsizing of the headlight 100*b* in the lateral direction can be achieved.

As the headlight 100*b*, the same various variants as those explained in Embodiment 1 can be adopted. More specifically, each of incidence surface parts 25 may correspond to two or more semiconductor light sources 1 out of the multiple semiconductor light sources 1. Further, each of the reflection surface parts 26*b* may correspond to two or more semiconductor light sources 1 out of the multiple semiconductor light sources 1. Further, the optical system 3*b* may include multiple condensing lenses 4.

As mentioned above, in the headlight 100*b*, the reflection surface portion 23*b* includes the multiple reflection surface parts 26*b* corresponding to the multiple semiconductor light sources 1, the multiple reflection surface parts 26*b* are aligned in a horizontal direction, and each of the multiple reflection surface parts 26*b* is constituted by a concave mirror or a plane mirror having a predetermined horizontal curvature Rh. As a result, control of the horizontal illumination area can be implemented.

Further, the multiple reflection surface parts 26*b* include the one or more first reflection surface parts 26*b* provided inward in the alignment direction, and the two or more second reflection surface parts 26*b* provided outward in the alignment direction. The horizontal curvature Rh of each of the one or more first reflection surface parts 26*b* is set to a value which is small compared with the horizontal curvature Rh of each of the two or more second reflection surface parts 26*b*. As a result, downsizing of the integral-type optical member 2*b* can be achieved. As a result, further downsizing of the headlight 100*b* can be achieved.

It is to be understood that any combination of two or more of the above-mentioned embodiments can be made, various changes can be made in any component according to any one of the above-mentioned embodiments, or any component according to any one of the above-mentioned embodiments can be omitted within the scope of the present disclosure.

INDUSTRIAL APPLICABILITY

The headlight of the present disclosure can be used for vehicles.

REFERENCE SIGNS LIST

1 semiconductor light source, 2, 2*a*, 2*b* integral-type optical member, 3, 3*a*, 3*b* optical system, 4 condensing lens, 21 incidence surface portion, 22 cutoff line formation portion, 23, 23*a*, 23*b* reflection surface portion, 24 exit surface portion, 25 incidence surface part, 26, 26*a*, 26*b* reflection surface part, and 100, 100*a*, 100*b* headlight.

The invention claimed is:

1. A headlight for vehicle comprising:

multiple semiconductor light sources arranged in a line; and an optical system including an integral-type optical member to form a predetermined light distribution by using light outputted by the multiple semiconductor light sources, wherein the integral-type optical member has an incidence surface portion, a cutoff line formation portion, a reflection surface portion and an exit surface portion, the incidence surface portion, the cutoff line formation portion, the reflection surface portion and the exit surface portion are arranged in order in such a way as to be along an optical path in the optical system, the exit surface portion has a uniform vertical curvature, and a horizontal illumination area is controlled by the reflection surface portion in such a way as to narrow, and a vertical illumination area is controlled by the exit surface portion.

2. A headlight for vehicle comprising:

multiple semiconductor light sources arranged in a line; and an optical system including an integral-type optical member to form a predetermined light distribution by using light outputted by the multiple semiconductor light sources, wherein the integral-type optical member has an incidence surface portion, a cutoff line formation portion, a reflection surface portion and an exit surface portion, the incidence surface portion, the cutoff line formation portion, the reflection surface portion and the exit surface portion are arranged in order in such a way as to be along an optical path in the optical system, the exit surface portion has a uniform vertical curvature, and a horizontal illumination area is controlled by the reflection surface portion and a vertical illumination area is controlled by the exit surface portion, wherein the reflection surface portion includes multiple reflection surface parts corresponding to the multiple semiconductor light sources, the multiple reflection surface parts are aligned in a horizontal direction, and each of the multiple reflection surface parts includes either a concave mirror or a plane mirror, the concave mirror and the plane mirror each having a predetermined horizontal curvature.

3. The headlight for vehicle according to claim 2, wherein the multiple reflection surface parts include one or more first reflection surface parts provided inward in an alignment direction, and two or more second reflection surface parts provided outward in the alignment direction, and a horizontal curvature of each of the two or more second reflection surface parts is set to a value which is small compared with a horizontal curvature of each of the one or more first reflection surface parts.

4. The headlight for vehicle according to claim 2, wherein the multiple reflection surface parts include one or more first reflection surface parts provided inward in an alignment direction, and two or more second reflection surface parts provided outward in the alignment direction, and a horizontal curvature of each of the one or more first reflection surface parts is set to a value which is small compared with a horizontal curvature of each of the two or more second reflection surface parts.

5. The headlight for vehicle according to claim 2, wherein one reflection surface part out of the multiple reflection surface parts corresponds to two or more semiconductor light sources out of the multiple semiconductor light sources.

6. The headlight for vehicle according to claim 2, wherein the exit surface portion is provided for a front portion of the integral-type optical member, and the reflection surface portion is provided for a rear portion of the integral-type optical member.

* * * * *